United States Patent [19]

Leverberg

[11] 4,253,488
[45] Mar. 3, 1981

[54] RETAINER FOR THREADED COUPLING ELEMENTS

[75] Inventor: Siegfried Leverberg, Oberhausen, Fed. Rep. of Germany

[73] Assignee: Hydrotechnik GmbH, Muhlheim, Fed. Rep. of Germany

[21] Appl. No.: 877,721

[22] Filed: Feb. 14, 1978

[30] Foreign Application Priority Data

Dec. 16, 1977 [DE] Fed. Rep. of Germany ....... 2756084

[51] Int. Cl.³ ............................................. F16K 27/08
[52] U.S. Cl. ................. 137/382; 251/149.6; 220/85 P; 220/375
[58] Field of Search ............. 137/377, 382; 220/85 P, 220/375, 288; 251/149.6

[56] References Cited

U.S. PATENT DOCUMENTS

| | | | |
|---|---|---|---|
| 1,836,811 | 12/1931 | McNeal | 220/375 |
| 2,380,576 | 7/1945 | Buttner | 137/382 |
| 2,888,249 | 5/1959 | Tinker | 220/288 |
| 3,181,725 | 5/1965 | Friedl | 220/375 |
| 3,883,030 | 5/1975 | Mathews et al. | 220/375 |
| 4,002,186 | 1/1977 | Fink et al. | 137/614.03 |
| 4,004,614 | 1/1977 | Mackal et al. | 220/375 |
| 4,095,713 | 6/1978 | Norton | 137/377 |

FOREIGN PATENT DOCUMENTS 1855368 8/1962 Fed. Rep. of Germany .
7537618 6/1976 Fed. Rep. of Germany .
2239641 2/1975 France .

Primary Examiner—Martin P. Schwadron
Assistant Examiner—A. Michael Chambers
Attorney, Agent, or Firm—Schwartz, Jeffery, Schwaab, Mack, Blumenthal & Koch

[57] ABSTRACT

A safety retainer for threaded coupling elements of a valved bush includes a deformable friction locking ring for a threaded safety cap or tube coupling nut adapted to be secured to the bush; a flexible retainer for the cap connected to the locking ring; a special cap nipple insertable into the bore of the bush; a sealing ring in the bore of the bush for engaging the cap nipple; and a tapered tube connector sealing nipple arrangement that engages the sealing ring in the bush in a special manner to preserve the life of the seal. The cap or coupling nut is threaded on the bush and is forced over the locking ring which elastically deforms to hold the cap or nut against unintentional loosening. The cap is held captive by the retainer when it is loosened and removed, and the tube coupling sealing nipple cooperates with the valve in the bush in a desired manner while it does not damage the seal ring in the tube connector side of the bore of the bush. Specific forms of locking rings are disclosed. A special thread pattern with wide angled load carrying faces is used for the external bush threads and the internal cap and coupling nut thread.

13 Claims, 7 Drawing Figures

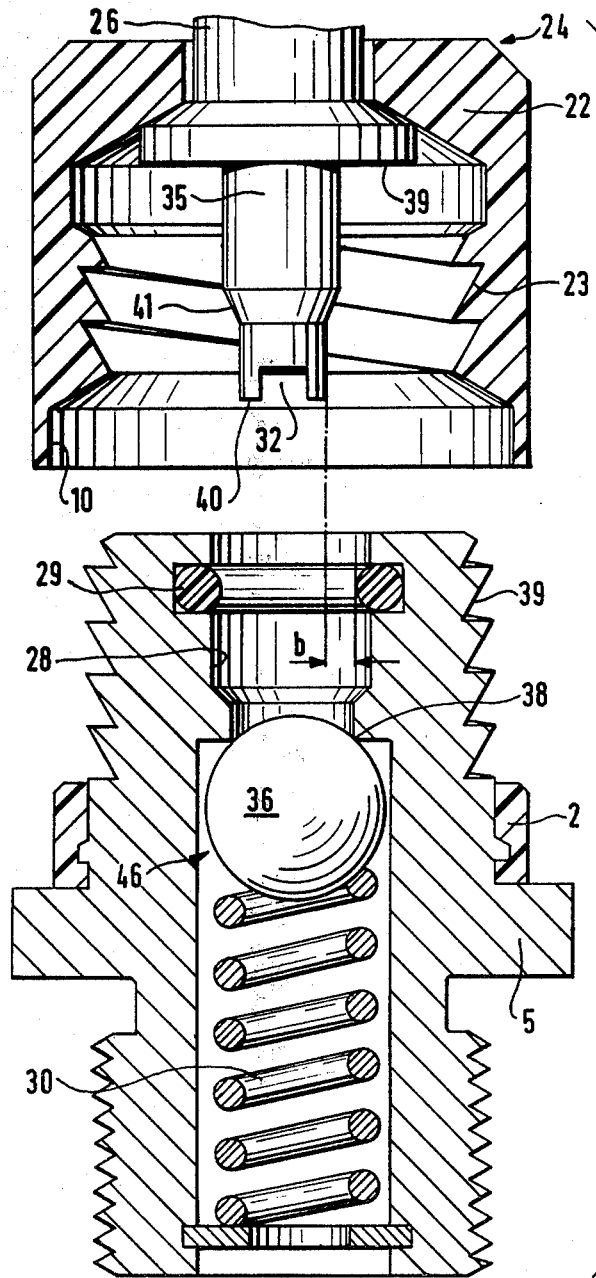
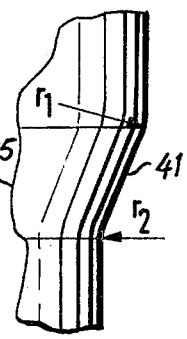
FIG.5a
FIG.5

RETAINER FOR THREADED COUPLING ELEMENTS

FIELD OF THE INVENTION

The invention relates to safety retainers for threaded fluid coupling elements.

BACKGROUND OF THE INVENTION

The invention concerns a safety retainer for threaded or rapid couplings used to create a connection between a pressurized system in combination with a male tube connector nipple cooperating with a female bore in a fixed receiving nipple or bush and a sealing ring arranged in an expanded part of the bore in the receiving bush applied against the mating connecting male nipple, together with a check valve, opening upon contact from the outside and located in the coupling bush.

Threaded couplings of this type serve, for example, to establish testing or measuring connections on pressurized lines, with the coupling bush securely and usually fixedly installed, usually with external threading, on the pressure line of hydraulic or pneumatic systems. For the duration of the testing or measuring work, a sealing connector nipple including a hollow male pin is screwed into the coupling bush by means of a cap nut, solidly connected with a flexible tube or pipe. The couplings may be connected, for example, under pressure, i.e. without closing down the installation, with suitable measuring instruments by means of measruing tubes.

With permanently installed instruments, for example manometers, manometer selector switches and pressure switches, the flexible measuring tubes may be connected in the manner of electric cables so that the expensive installation of tubing is eliminated. With such measuring couplings, therefore, effective working pressures can be measured directly on hydraulic instruments without having to loosen vent screws and threaded tube connections. Couplings of this type are used in various structural elements and controls of hydraulic or pneumatic systems.

Following the disconnection of the coupling connection, a protective cap is screwed onto the coupling bush with its external thread for the purpose of preventing the entrance of dirt into the coupling bush and to provide an additional sealing function in the event that the check valve installed in the coupling bush should fail to seal tightly.

A prestressed elastic ring, known per se, performs a sealing function and secures the cap device against turning. The prestressing of the sealing and antiturning ring usually cannot exceed a certain very slight degree, because otherwise the introduction of a male cylindrical tube nipple, slotted in keeping with the present state of the art, would cause the immediate destruction of the ring.

The protective caps and tube connection and coupling bushes, known in themselves, are provided with standard threading and can be screwed together with the exertion of great care only, so that the protective cap or tube connection is screwed on until their internal contact surface touches the end surface of the fixed coupling bush. Additional torque must then be applied in order to securely tighten the protective cap or tube connection and, because for reasons of safety and convenient handling they are equipped with knurling only, the torque must be applied by hand. For this reason it is not immediately possible to determine the reliability of the connection, because it depends very substantially on the conscientiousness and force of the person who performs the screwing on of the protective cap or tube connection.

In cases where the pressure lines with the coupling parts installed are exposed to strong mechanical vibrations, even adequately tightened protective caps and tube connections may loosen by themselves, resulting in the loss of protection against dirt or in measuring errors with substantial subsequent potential damage. This occurs specifically because both the standard thread and the sealing and antiturning ring, the latter only slightly prestressed for wear considerations, are incapable of providing extensive resistance against the loosening of the protective cap or cap nut. This is a great disadvantage particularly when the hydraulic or pneumatic installation is used in very dirty environments, for example in dirty rooms or on the hydraulic lines of construction machinery or trucks.

Substantial danger may develop, if, for example, permanently installed measuring instruments provide false signals because of loose tube connections, leading to failures or incorrect control signals.

Another disadvantage of the prior art couplings consists of the fact that particularly the sealing and antirotation ring is subject to extensive wear, for reasons of design, and even under slight prestressing, especially if the decoupling process takes place under high pressures. Because the pressure in the connecting space between the coupling connector and the instrument connected is not released immediately, due to the retention of pressure following the closing of the check valve, the sealing and antirotation ring tends to migrate outwardly when the notched hollow pin of the tube connected sealing nipple is pulled out and to become squeezed in the slit between the internal surface of the extended part of the bush bore and the external surface of the hollow pin, particularly in its notched area.

SUMMARY OF THE INVENTION

The object of the invention therefore is to provide a retainer assembly for screw or rapid couplings in hydraulic or pneumatic systems of the type mentioned above, which secures the threaded coupling elements against spontaneous loosening or unscrewing.

The invention also has as its objectives to reduce wear during frequent use of the coupling, and the establishment of a push or screw connection with an additional improvement in sealing.

The objects are further achieved in keeping with the invention by the fact that with the retainer assembly of the type described above, the load carrying sides of the external screw-on threads of the coupling bush and the internal threads of the protective cap or a cap nut on the mating parts exhibit greater thread angles than standard threads; and that the flow channel between the check valve in the bush and the tube connector nipple is designed as a notch in the body of the valve. The valve element is located upon a compression spring and movable by the spring. Alternatively, a transverse slit or another notch in the narrowed distal end of the tube connector nipple, where the narrowing is designed so that the connector nipple can be inserted and removed without the narrow end contacting the sealing and antirotation ring, is provided.

Finally, the object of the invention is achieved by using an additional resilient locking ring for the threaded coupling or cap elements.

Through these measures, in keeping with the invention, the protective screw cap is secured in the screwed-on state so that spontaneous loosening due to the effect of mechanical vibration forces is prevented, while on the other hand the sealing and tube connector elements, and the location of the slit-like recesses, are designed and positioned so that even with frequent use and increased prestressing of the sealing and antirotation ring, only a very slight amount of wear takes place, thus improving and preserving the sealing effectively over extensive periods of time.

In a further development of the invention, the retainer is designed so as to include a cap retainer element integrally connected with a locking or securing ring and the ring furthermore is provided with a chamfer both at its lower inner end facing the coupling bush and at its outer end facing the protective screw cap or the nut cap of the tube connector.

A design of the securing ring of this type facilitates installation and also substantially reinforces the shake-proof seat of the cap.

In another embodiment of the invention, the holder element is designed as a retaining element integrally connected with a securing ring, and the receiving part of the coupling exhibits, for the purpose of axially mounting and holding the securing ring thereon, an external circumferential collar and the securing ring an internal groove that mates with the collar.

Through this measure of the invention, the securing ring is given two functions: i.e. first, to prevent the loss of the protective screw cap in the loose state; and secondly, to secure the protective screw cap or the cap nut in the screwed-on state so that spontaneous loosening under the effect of mechanical vibrational forces is prevented.

It is of advantage to provide the collar on the coupling bush of the screw or rapid coupling at its part facing the upper end of the retainer or retainer assembly with a chamfer, in a manner similar to the first example of embodiment of the invention described above.

The protective screw cap or the cap nut of the coupling used with the retainer of this invention advantageously exhibits below its external thread a cylindrical recess to receive the securing ring. The external diameter of the securing ring is, in accordance with the invention, larger than the diameter of the recess in the cap or nut, to thereby frictionally lock the cap or nut to the bush.

The use of a suitable plastic material and an appropriate design make it possible that the securing ring can be plastically deformed at its upper area to reduce the undesirable effects of manufacturing tolerances and that it remains elastically deformable at its lower part. It is of advantage to screw on the protective screw cap or cap nut with an essentially constant torque over the coupling bush of the screw coupling, until the securing ring is elastically jammed in the protective screw cap or cap nut. For this reason, it is advantageous to make the protective screw cap with its cover plate and its securing elements of a compression resistant, yet plastically and elastically deformable plastic material.

In a preferred embodiment of the object of the invention, the securing ring is provided with a relatively long chamfer and is plastically deformed at its upper end with a sizing tool during assembly and subject to a permanent deformation so that, independently of the original manufacturing tolerances, longitudinal beads with defined "external diameters" and permanent tensile stresses are produced on the circumference of the upper part of the ring. Where the securing ring is able to avoid the sizing tool because of the chamfer, it is only elastically deformed during sizing and is thus capable of resuming its original shape afterwards. Such a design—as confirmed by experiments—results in safe mounting of the securing ring without additional auxiliary measures in the corresponding recess of the coupling bush and in a largely constant, defined tightening and releasing torque in spite of the usual manufacturing tolerances.

The protective screw cap, in further keeping with the invention, exhibits a bore sealing nipple, arranged inside and integrally bonded with the bottom inner part of the cover of the protective screw cap. Between the sealing nipple on the cap and the inner bottom part of the protective screw cap, a supporting shoulder is advantageously arranged. In a further development of the invention, the supporting shoulder is integrally connected with the cap sealing nipple and the bottom part of the cover of the cap. This measure of the invention exercises an additional sealing effect on the screw or rapid coupling, and the supporting shoulder makes it possible to secure good adaptation between the sealing nipple and the other parts of the protective screw cap.

In a further development of the invention, the protective screw cap has in its cover part, on the outside, a recess to receive the holding nipple of a connecting disc, with a ring-shaped end of the retainer element located between the disc and cover part of the protective screw cap, through which the holding nipple of the disc is inserted. The holding nipple with the connecting disc again consists of an elastically deformable plastic material in keeping with the invention.

In a logical application of the invention, the specific design of the retainer assembly also serves to provide a vibration safe coupling, in which the coupling nut designed as a cap nut of a tube connection is screwed onto the coupling bush in place of the protective screw cap. In this embodiment of the invention, the screw retainer of a tube connection has a coupling nut provided with an internal screw thread and a cylindrical recess, the recess having an internal diameter slightly smaller than the external diameter of the securing ring. This measure of the invention insures that even during the occurrence of resonance vibrations the coupling nut will not be loosened spontaneously. The coupling nut preferably again consists of a plastic material with external fluting, but can also be made of a metal.

The invention is explained more specifically with the aid of the appended drawings, which illustrate several examples of the embodiment.

DESCRIPTION OF PREFERRED EMBODIMENTS

DESCRIPTION OF THE DRAWINGS

FIG. 5 shows a longitudinal section through a coupling bush with external thread and a screwable cap nut of a tube connection; and FIG. 5a is an enlarged representation of the tapered section of the sealing nipple of FIG. 5.

DETAILED DESCRIPTION

Figure 1:
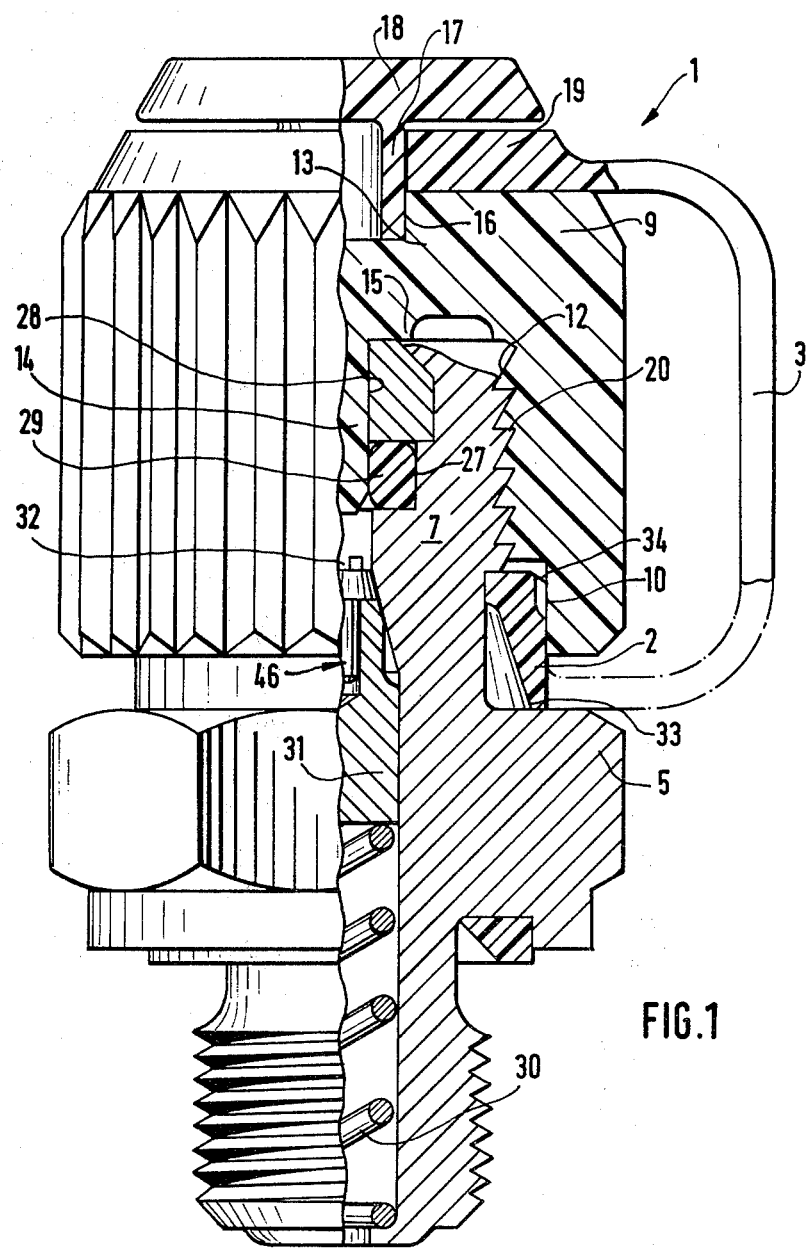
FIG. 1 shows a longitudinal section through a coupling bush with an external thread and screwed-on protective cap, including the retainer assembly in accordance with the invention.

FIG. 1 represents an example of embodiment of the invention, in which the safety retainer assembly 1 is screwed onto the outer end of an externally threaded coupling bush 5. The retainer assembly 1 consists of the protective closed cover screw cap 9, the connecting disc 18 with its holding nipple 17 extending through the annular (upper) end 19 of the retaining element 3 and the retaining element 3 with its securing ring 2. The securing ring 2 is located at the outer (lower) end of the holding element 3 and is mounted on an area of the coupling bush 5 below the base of its external threads. The securing ring 2 is provided with chamfers 33, 34 at its inner lower end facing the externally threaded part 7 of bush 5 and at its upper outer end facing the protective screw cap 9, respectively. The lower chamfer 33 serves, among other reasons, to facilitate the installation of the securing ring 2 over threaded part 7, while the upper chamfer 34 simplifies the screwing on of the protective screw cap 9. Connecting disc 18 may hold retaining element 3 on cap 9 while permitting cap 2 to turn relative to retainer 3.

The protective screw cap 9 of the retainer 1 is provided below its internal thread 12 with a cylindrical undercut recess 10, serving to receive the securing ring 2. The external diameter of the securing ring 2 is slightly larger than the internal diameter of the recess 10 of the protective screw cap 9, as illustrated at a in FIG. 3. The protective screw cap 9, along with its retainer 3 and its securing elements 2 and 19, is made of a compression resistant and plastically and elastically deformable plastic material. For this reason, it is possible to rotate the protective screw cap 9 into overlapping relationship with the securing ring 2, in which process the lower part of the securing ring 2 is reduced in its external diameter and slightly deformed inwardly elastically. The securing ring 2 then applies an expanding effect on the recess 10, thus providing a secure holding action which reinforces the additional effect of a special thread pattern to be discussed below in connection with FIG. 4.

For the insertion of the nipple 14 in the cover part 13 of cap 9, the coupling bush 5 is provided with a bore 28, in the wall of which an annular groove 27 is provided to receive the sealing and antirotation ring 29. The valve body 31, arranged as a check valve 46 on a compression spring 30 and movable by the spring, has at its upper sealing end a flow channel 32, here shaped as a slit-like notch. With the aid of this provision, a hollow nipple (35 in FIG. 5) of a pipe connection can be designed entirely identical, except for length, with the nipple 14 of the cover part 13 of the protective screw cap 9. This results in the sealing and antirotation ring 29 not being damaged by the introduction or withdrawal of nipple 35 into or out of bore 28. Even during decoupling under pressure, damage to the ring 29 is safely avoided.

The provision of the flow channel 32, here in the form of a slit, on the valve body 31 has the additional advantage that the body is always protected against dirt.

When the cap 9 is removed, the securing ring 2 serves, in cooperation with its integrally formed or bonded retainer 3, to maintain the connection of the protective screw cap 9 with the coupling nipple 5 so that the protective screw cap 9 cannot be lost.

The protective screw cap 9 further displays a sealing nipple 14, arranged internally and integrally formed or bonded with the cover part 13 of the protective screw cap 9. Between the sealing nipple 14 and the cover part 13 of the protective screw cap 9 a supporting shoulder 15 is arranged; this serves to increase the elasticity of the external part of the protective screw cap 9. In addition, the supporting shoulder also serves to improve the sealing effect of the screw retainer 1 overall.

The sealing shoulder 15 forms, with the sealing nipple 14 and the cover part 13, a single part of the same material.

The protective screw cap 9 is provided in its cover part 13 externally with a recess 16, which serves to receive the holding nipple 17 of a connecting disc 18. Between the disc 18 and the cover 13 of the protective screw cap 9, a ring-shaped end 19 of the retainer element 3 is arranged; the holding nipple 17 extends through this ring. In this manner, the ring-shaped end 19 of the retainer 3 is secured permanently and simply. For this purpose, the holding nipple 17 together with the disc 18 consists of an elastically deformable plastic material. To fasten the nipple 17 in the recess 16 with the protective screw cap 9, an ultrasonic welding or bonding process is used, which makes it possible to weld inaccessible parts together. The end of the nipple is heated by the process so that it fuses with the bottom of the recess 16, forming an integral, insoluble connection.

Figure 2:
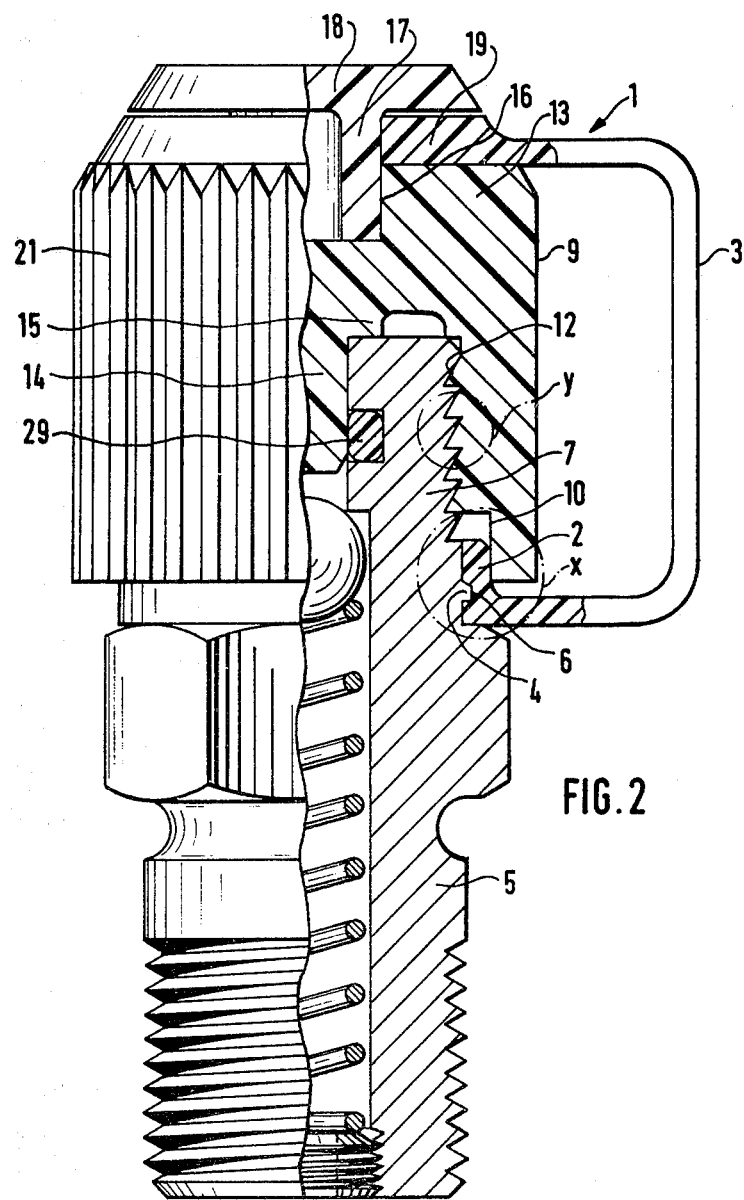
FIG. 2 shows a longitudinal section through a coupling bush, again with a screwed-on protective cap, using an alternate embodiment of the invention.
Figure 3:
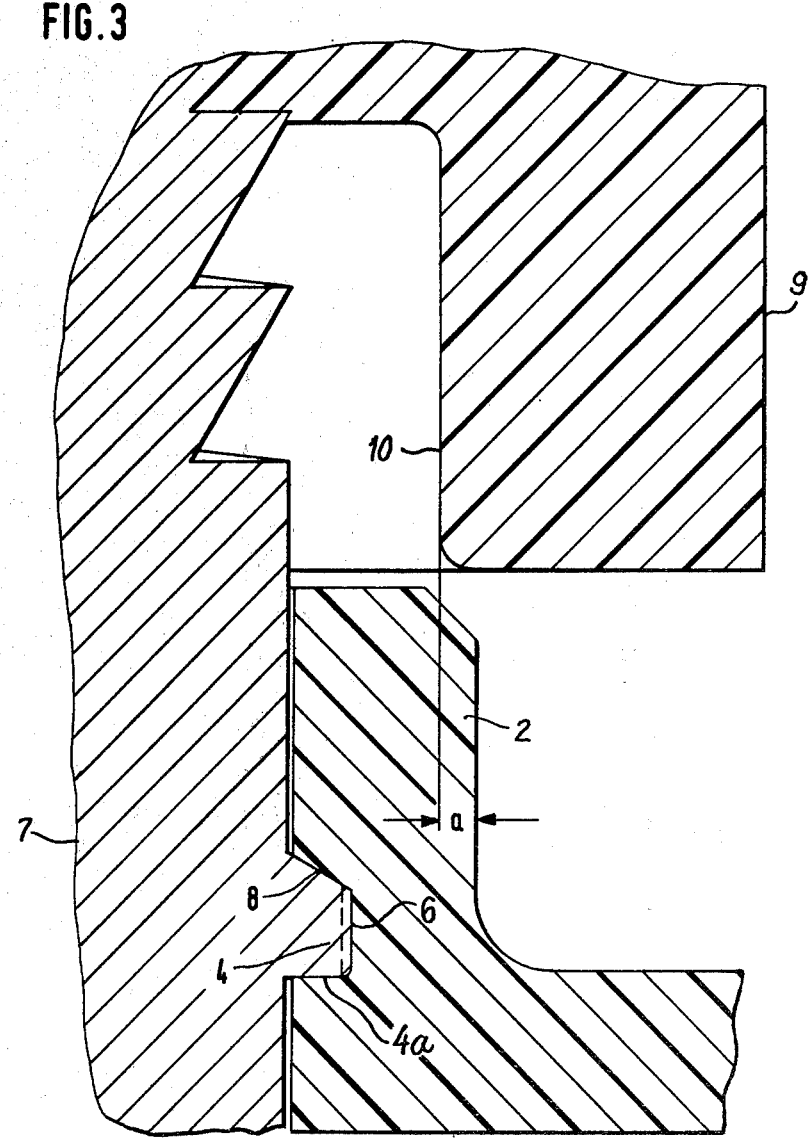
FIG. 3 shows an enlarged detail view of the area bounded by the circle "X" in FIG. 2.

In FIGS. 2 and 3, another embodiment of the invention is presented. In all the figures, similar or comparable elements are given the same reference numbers so that the following description is restricted essentially to parts exhibiting different modes of embodiment. In essence, these are the securing ring 2, which is again joined together with the retainer 3 in an integral manner. The coupling bush 5, however, is provided with a protruding collar 4 for the axial mounting of the securing ring 2, while the securing ring 2 is provided with a groove 6 corresponding in shape to the collar 4, which the latter engages during the mounting of the securing ring 2 on the coupling bush 5, because both the securing ring 2 and the retainer 3 consist of a material which is here elastically deformable. The collar 4 is also provided at it upper end, facing the upper end of the retainer assembly, with a downwardly and outwardly sloping (see FIG. 3) chamfer 8, which serves the purpose to facilitate the mounting of the securing ring 2. The under part 4a of the collar 4 (FIG. 3) opposing the chamferred part 8, conversely, is designed normal to the axis of the nipple 5 so that the loosening and removal of the securing ring 2 is made more difficult.

In another embodiment, not illustrated, the retainer 3 can be replaced by a chain or a similar joining element; here the securing ring 2 and the ring-shaped end 19 possess suitable connecting elements for the chain.

Figure 4:
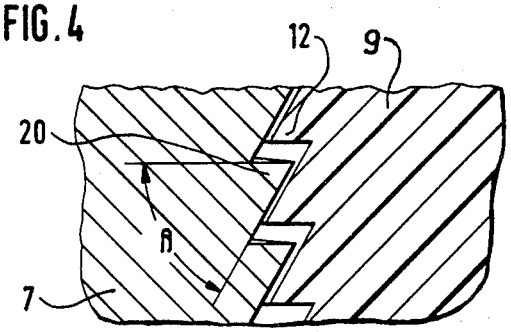
FIG. 4 shows an enlarged detail view of the threads between the coupling bush and the protective cap, indicated in FIG. 2 by a circle and designated with "Y"

FIG. 4 shows a detail delineated by a circle "Y" in FIG. 2. The load carrying sides of the screw thread 20 of the screw part 7 and of the internal thread 12 of the protective screw cap 9 are equipped with larger beta ($\beta$) flank angles than standard threads.

In this manner it becomes necessary to apply a greater force to loosen the protective screw cap 9 (or the cap nut 22 of the pipe coupling according to FIG. 5) which improves security against unintentional loosening by vibrational forces. This effect of securing against unintentional loosening by vibrational forces is also reinforced by an increase in the prestressing of the sealing and antirotation ring 29, which is protected against damage by the fact that the flow channel 32 necessary for the establishment of a fluid connection is placed not in the pipe coupling nipple but on the valve body 31. In this manner the slit-like flow channel 32 is incapable of damaging the sealing and antirotation ring 29. Another advantage attained is the fact that the slit-like recess in the bore 28, sensitive to outside effects, is especially protected.

In the embodiment of FIG. 2, the securing ring 2 is again provided with an external diameter larger than the internal diameter of the recess 10 of the protective screw cap 9 so that in combination with the use of an elastically deformable material an additional jamming effect is obtained, such as explained in more detail in connection with FIG. 1. In the embodiment of FIG. 2, the collar 4 prevents the displacement or release of the securing ring 2 from its position during an intentional loosening of the protective screw cap 9. This insures the satisfactory loosening of the screw or rapid coupling in spite of the jamming effect.

Figure 4A:
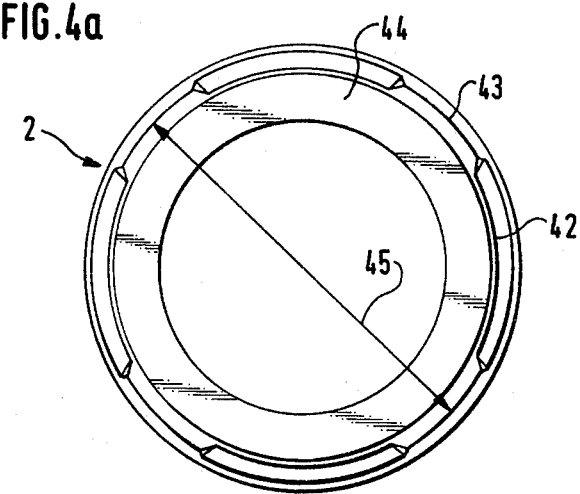
FIG. 4a shows a top view of the securing ring shown in FIG. 1 with the protective screw cap screwed off.

In FIG. 4a, a top view of the securing ring 2 of FIG. 1 is illustrated. Here the securing ring 2 is already located in the receiving groove of the nipple 5. The ring 2 has been plastically deformed at its upper part with the aid of a sizing tool. FIG. 4a displays the condition of the securing ring prior to the screwing on of the protective screw cap 9.

By means of a sizing tool (not shown), the securing ring 2 is plastically and permanently deformed at its previously circular upper part so that at its upper circumference several flat depressions 42 and, through the displacement of the material, also several longitudinal beads 43, are formed. After the removal of the sizing tool, the beads 43, because of their greater rigidity (material accumulation) exercize substantial permanent tensile stresses upon the ring segments 44. This results in the fact that the securing ring 2 always remains under prestressing in the corresponding receiving groove of the coupling bush 5 and thus completely fills the upper part of the receiving groove. These measures of the invention—as confirmed by experiments—reliably prevent the displacement of the securing ring 2 from its position on the coupling bush 5 during the intentional loosening of the protective screw cap 9. Specifically, the running up of the securing ring 2 onto the thread 20 of the threaded part 7 (see FIG. 1) during the screwing off of the protective screw cap 9 is prevented so that it cannot be rotated off with the cap or else cut and damaged by the thread 20.

As described above, the beads 43 are formed during the sizing so that independently of the original manufacturing tolerances an accurately defined "external diameter" 45 is created and the tightening and releasing torque assumes highly constant values.

FIG. 5 shows a further example of the embodiment of the invention. The retainer assembly is designed in this embodiment to be used in connection with cap 24 of a pipe or tube connector, the connector including a cap nut 22 provided with an internal screw thread 23 and a lower cylindrical recess 10, similar to the protective screw cap 9 in the examples of the embodiments according to FIGS. 1 and 2. The recess 10 has an internal diameter slightly smaller than the external diameter of the securing ring 2. The securing ring 2, which consists of a compression resistant and elastically deformable material, thus exercizes a jamming action, which as in the case of the protective screw cap 9, prevents the unintentional loosening of nut 22, for example by vibration forces. In order to prevent the escape of the system pressure in the uncoupled state, a check valve 46 is installed in the coupling bush 5, said check valve having a sealing element 36, which is pressed against a sealing seat 38 by a spring 30. To obtain sealing and safety against rotation, a sealing and antirotation ring 29 is provided in the upper expanded part of the bush shown in the top portion of the drawing, located in a cylindrical recess in the internal wall of the extended part of the bush bore 28.

The safety retainer for the coupling assembly 24 includes a sealing connector nipple 35 designed in the form of a hollow pin, which at its end facing the distal or front surface 40 is provided with a flange collar 39. The sealing nipple 35 is narrow at its distal end 40 so that its external diameter is smaller by a measure b than the internal diameter of the unstressed sealing and antirotation ring 29. The transition between the narrowed end of the sealing nipple 35 and the full section consists of a conical or tapered surface 41, which passes with rounding radii $r_1$ and $r_2$ (see FIG. 5a) into the fully wide section and the narrowed section of the hollow pin. A flow channel 32 is formed on the distal end side of the hollow pin, through which pressure can pass into the sealing nipple following the opening by contact with the check valve 46. A fluid line 26 is attached to the collar 39, though which a connection may be established to the instrument that is to be exposed to the pressure of the system. The collar 39 also secures the cap nut 22 to the line 26, which can be screwed onto the thread 39 on the coupling nipple 5. During the coupling process, the sealing nipple 35 is inserted in the bore 28 of the nipple 5 and the cap nut 22 screwed onto the thread 39a of the coupling bush 5. In the process, the sealing and antirotation ring 29 slides along the conical surface 41 onto the full width section of the sealing nipple 35 so that sealing toward the outside is achieved. During the continued screwing on of the cap nut 22 onto the thread 39, the surface 40 of the sealing nipple 35 displaces the sealing element 36 of the check valve 46 from the valve seat 38, so that a pressurized connection between the lower part of the bore 28 and the line 26 is opened. As mentioned above, the flow channel 32 on the forward (distal) surface 40 of the sealing nipple 35 insures free passage of the pressure medium. The sealing and antirotation ring 29 adjacent to the nipple 35 provides a safe sealing action outward and—because of its increased prestressing in connection with other characteristics of the object of the invention—solid protection against rotation. When the coupling is loosened by unscrewing the cap nut 22, the sealing nipple 35 is withdrawn progressively from the bush 5 so that the check valve 46 is again closed. The outer seal formed by the sealing and antirotation ring 29 is then still under the full pressure of the system, because the line 26 and the instrument connected with it act as a pressure reservoir. During the further withdrawal of the sealing nipple 35 from the bush bore 28, the sealing and antirotation ring 29 slides over the conical surface 41 until it breaks contact because of the reduction in diameter of the hollow pin 35 at this point. The seal cannot be damaged during this breaking of contact because there are no notches or edges at this location capable of causing such damage. The releasing process is thus very gentle so that long life of the elements is obtained. In the screwed on state of the cap nut 22 to establish a flow connection between the line 26 and the bore 28, the protective screw cap 9 (FIG. 1 or 2) remains attached to the nipple 5 by way of the retainer 3, so that it cannot be lost. This results in the advantage that the protective screw cap 9 is always readily available to close the coupling bush 5. The securing ring 2 thus serves by itself or in combination with the retainer 3 to provide a vibration safe fastening both of the protective screw cap 9 and the cap nut 22. It is therefore not necessary to provide special elements for the vibration safe fastening of the connector 24, compared with the fastening of the protective screw cap 9, because the corresponding function of the sealing and antirotation ring 29 and of the larger screw angle beta, in keeping with FIG. 4, are effective here also.

The vibration safe fastening of the protective screw cap 9 and also of the cap nut 22 makes it necessary to apply higher torques during the loosening. For this reason, an especially advantageous coarse knurling is provided on the surface of the protective screw cap 9 and the cap nut 22, as shown in FIGS. 1 and 2.

What is claimed is:

1. A retainer assembly for an internally threaded valve coupling element adapted to be screwed onto a fluid coupling bush having external threads extending over a portion of the length of the bush, comprising:
    an elastically deformable annular ring secured around an area of the bush adjacent the base of the external bush threads, said internally threaded element normally overlapping said bush area when it is screwed completely onto the bush;
    said ring being dimensioned to have an outer diameter larger by a predetermined amount than the internal diameter of a recess in said internally threaded element in the area thereof normally overlapping said bush area and adapted to hold said ring against said bush when the internally threaded element is completely screwed onto the bush, said predetermined amount enabling the ring material to be engaged by and deformed to an extent not exceeding its elastic limit by the internally threaded element when it is screwed completely onto the bush;
    said external threads of the fluid coupling bush and said internal threads of the valve coupling assembly displaying load carrying sides having flank angles ($\beta$) larger than angles in the range of 27.5°–30°;
    said bush including an axial bore and means normally biasing a check valve closed in the bore said check valve having a slotted flow channel portion;
    a cover cap for the bush, said internally threaded element comprising said cover cap, the cap having an axially cylindrical nipple extending inwardly of the cap, said bush bore including an annular groove, an elastomeric sealing ring in the groove, the sealing ring having an internal diameter smaller than the bore and smaller than the external diameter of the nipple by a predetermined amount, said predetermined amount enabling the cap nipple to elastically deform the sealing ring when the cap is screwed over the bush and to be thereby retained against rotation at least in part by said ring.

2. Apparatus as recited in claim 1, including a flexible retainer element attached both to said ring and to said cap for retaining the cap adjacent the bush when it is removed therefrom.

3. Apparatus as recited in claim 2, said cap having an internal bore in its external cover area; a connecting disc having an enlarged portion and a depending nipple portion, the nipple portion being fixedly secured in said bore; said flexible retainer having an annular ring portion where it is attached to the cap, said disc nipple extending through the annular ring opening of the retainer; said enlarged portion of the disc securing the retainer relative to the cap.

4. Apparatus as recited in claim 1, including a cover cap, said cap comprising said internally theaded element, the cap having an internal enlarged bore area where it overlaps the securing ring, said bore area being larger in diameter than the maximum diameter of the threaded part of the cap.

5. Apparatus as recited in claim 4, said cap being formed of plastic material.

6. Apparatus as recited in claim 1, said ring being chamferred at its upper outer edge area facing the outer end of the bush for facilitating the internally threaded element to pass over the ring.

7. Apparatus as recited in claim 6, said ring being chamferred at its lower inner edge area facing the inner end of the bush for facilitating its application to the bush.

8. Apparatus as recited in claim 1, said area of the bush around which the ring is secured comprising an annular groove having a bottom diameter smaller than the largest external diameter of the threaded part of the bush.

9. Apparatus as recited in claim 8, said ring being internally stressed to fit tightly about the bush.

10. Apparatus as recited in claim 1, said area of the bush around which the ring is secured including a circumferential ridge area, said ring including an inner complimentary circumferential groove area, said ring mating closely with the circumference of the bush and being axially held in place on the bush by the interlocking of said ridge and groove areas.

11. Apparatus as recited in claim 1, said cap having an annular supporting shoulder adjacent said cap nipple, said shoulder being larger in diameter than the bore of the bush, and adapted to engage the outer end of the bush when the cap is tightly screwed onto the bush.

12. Apparatus as recited in claim 1, said ring being plastically and permanently deformed so its upper circumference includes flat depressions and longitudinal beads.

13. Apparatus as recited in claim 1, said ring having a tapered inner diameter, the smaller inner diameter engaging said bush area at the end of the ring nearest the outer end of the bush, the larger inner diameter providing a clearance that permits the ring to elastically deform when pressed radially inwardly, and a chamfer on the outer end of the ring opposite the smaller diameter.

* * * * *